United States Patent
Ko et al.

(10) Patent No.: US 7,218,930 B2
(45) Date of Patent: May 15, 2007

(54) AUTOMATIC RECOGNITION SYSTEM FOR USE IN A WIRELESS LOCAL AREA NETWORK (LAN)

(75) Inventors: Ming-Chih Ko, Taipei Hsien (TW); De-Jen Lu, Taipei Hsien (TW)

(73) Assignee: Acer Incorporated (TW)

( * ) Notice: Subject to any disclaimer, the term of this patent is extended or adjusted under 35 U.S.C. 154(b) by 616 days.

(21) Appl. No.: 10/814,631

(22) Filed: Apr. 1, 2004

(65) Prior Publication Data

US 2005/0025103 A1 Feb. 3, 2005

(30) Foreign Application Priority Data

Jul. 31, 2003 (TW) .............................. 92121215 A

(51) Int. Cl.
*H04M 11/00* (2006.01)
*H04Q 7/20* (2006.01)

(52) U.S. Cl. ................ 455/426.1; 455/403; 455/426.2; 370/313; 370/338; 370/395.54; 709/221

(58) Field of Classification Search ............ 455/426.1, 455/426.2, 403; 709/221, 220, 9–15, 103, 709/205; 370/338, 259, 339, 395.56, 901, 370/313, 310
See application file for complete search history.

(56) References Cited

U.S. PATENT DOCUMENTS 6,961,762 B1* 11/2005 Yeap et al. .................. 709/221
7,042,852 B2* 5/2006 Hrastar ....................... 370/310
7,058,796 B2* 6/2006 Lynn et al. ..................... 713/1

* cited by examiner

*Primary Examiner*—Tony T. Nguyen
(74) *Attorney, Agent, or Firm*—Pillsbury Winthrop Shaw Pittman, LLP

(57) ABSTRACT

The present invention discloses a server automatically detecting a new joining portable device in a wireless local area network (LAN) and providing the new joining portable device with a new identification number, thereby the portable device can automatically access the wireless LAN and obtain the services from the server.

16 Claims, 5 Drawing Sheets

AUTOMATIC RECOGNITION SYSTEM FOR USE IN A WIRELESS LOCAL AREA NETWORK (LAN)

This application claims priority of Taiwanese application No. 092121215, filed on Jul. 31, 2003.

BACKGROUND OF THE INVENTION

1. Field of the Invention

The present invention relates to a method and a system for automatically detecting a new joining portable device in a wireless local area network (LAN). It is able to confirm and update a user's operation status corresponding to the new joining portable device and provide suitable services according to the user's demand.

2. Description of the Prior Art

High-speed wireless LANs can provide the benefits of network connectivity without the restrictions of being tied to a location or tethered by wires. Wireless connections can extend or replace a wired infrastructure in situations where it is costly or prohibitive to lay cables. Temporary installations represent one example of when a wireless network might make sense or even be required. Some types of buildings or building codes may prohibit the use of wiring, making wireless networking an important alternative.

And of course the "no new wires" phenomenon involving wireless, along with phone line networking and even electrical power line networking, has become a major catalyst for home networking and the connected home experience.

The increasingly mobile user becomes a clear candidate for a wireless LAN. Portable access to wireless networks can be achieved using laptop computers and wireless Network Interface Cards (NICs). This enables the user to travel to various locations such as meeting rooms, hallways, lobbies, cafeterias, classrooms, etc. and still have access to their networked data. Without wireless access, the user would have to carry clumsy cabling and find a network tap to plug into.

Beyond the corporate campus, access to the Internet and even corporate sites could be made available through public wireless "hot spots" networks. Airports, restaurants, rail stations, and common areas throughout cities can be provisioned to provide this service. When the traveling worker reaches his or her destination, perhaps meeting a client at their corporate office, limited access could be provided to the user through the local wireless network. The network can recognize the user from another corporation and create a connection that is isolated from local corporate network but provides Internet access to the visiting user.

There are currently two prevalent wireless LAN solutions being deployed. These are the IEEE 802.11 standards, primarily 802.11b, which is referred to as Wi-Fi™, and the solution proposed by the HomeRF™ working group. These two solutions are not interoperable with each other or with other wireless LAN solutions. While HomeRF™ is designed exclusively for the home environment, Wi-Fi™ is designed for and is being deployed in homes, small and medium size businesses, large enterprises, and a growing number of public wireless networking hot spots. Several major laptop vendors are shipping or are planning to ship laptops with internal Wi-Fi™ NICs.

Microsoft also partnered with 802.11 NIC vendors to improve the roaming experience by automating the process of configuring the NIC to associate with an available network.

The wireless NIC and its NDIS driver need to do very little beyond supporting a few new NDIS Object Identifiers (OIDs) used for the querying and setting of device and driver behavior. The NIC will scan for available networks and pass those to Windows XP. Windows XP has a Wireless Zero Configuration service that then takes care of configuring the NIC with an available network. In the case where there are two networks covering the same area. The user can configure a preferred network order and the machine will try each network in order until it finds an active one. It is even possible to limit association to only the configured, preferred networks.

If no 802.11 networks are found nearby, Windows XP will configure the NIC to use ad hoc networking mode. It is possible for the user to configure the wireless NIC to either disable or be forced into ad hoc mode. These zero configuration enhancements are integrated with the security enhancements such that if authentication fails, another network will be located to attempt association with.

Zero configuration is a client-based user identification method. Zero configuration allows wireless devices to work in different modes without the need for configuration changes after the initial configuration. The zero configuration initiative automatically provides the IP address, the network prefix, the gateway router location, the DNS server address, the address of a Remote Authentication Dial In User Service (RADIUS) or Internet Authentication Service (IAS) server, and all other necessary settings for the wireless device. It also provides security features for the client.

Wireless LANs are built using two basic topologies. These topologies are variously termed; including managed and unmanaged, hosted and peer-to-peer, and infrastructure and ad-hoc.

An infrastructure topology is one that extends an existing wired LAN to wireless devices by providing a base station (called an access point). The access point bridges the wireless and wired LAN and acts as a central controller for the wireless LAN. The access point coordinates transmission and reception from multiple wireless devices within a specific range; the range and number of devices depend on the wireless standard being used and vendor's product. In infrastructure mode there may be multiple access points to cover a large area or only a single access point for a small area such as a single home or small building.

An ad-hoc topology is one in which a LAN is created solely by the wireless devices themselves, with no central controller or access point. Each device communicates directly with other devices in the network rather than through a central controller. This is useful in places where small groups of computers might congregate and not need access to another network. For example, a home without a wired network, or a conference room where teams meet regularly to exchange ideas, are examples of where ad-hoc wireless networks might be useful.

For example, when combined with today's new generation of smart peer-to-peer software and solutions, these ad hoc wireless networks can enable traveling users to collaborate, play multiplayer games, transfer files or otherwise communicate with one another using their PCs or smart devices wirelessly.

The laptop or smart device, which is characterized as a "station" in wireless LAN parlance, first has to identify the available access points and networks. This is done through monitoring for "beacon" frames from access points announcing themselves, or actively probing for a particular network by using probe frames.

The station chooses a network from those available and goes through an authentication process with the access point. Once the access point and station have verified each other, the association process is started. Association allows the access point and station to exchange information and capabilities. The access point can use this information and share it with other access points in the network to disseminate knowledge of the station's current location on the network. Only after association is complete can the station transmit or receive frames on the network.

In infrastructure mode, all network traffic from wireless stations on the network goes through an access point to reach the destination on either the wired or wireless LAN. Access to the network is managed using a carrier sense and collision avoidance protocol. The stations will listen for data transmissions for a specified period of time before attempting to transmit—this is the carrier sense portion of the protocol. The station must wait a specific period of time after the network becomes clear before transmitting. This delay, plus the receiving station transmitting an acknowledgement indicating a successful reception form the collision avoidance portion of the protocol. Note that in infrastructure mode, either the sender or receiver is always the access point.

Because some stations may not be able to hear each other, yet both still be in range of the access point, special considerations are made to avoid collisions. This includes a kind of reservation exchange that can take place before a packet is transmitted using a request to send and clear to send frame exchange, and a network allocation vector maintained at each station on the network. Even if a station cannot hear the transmission from the other station, it will hear the clear to send transmission from the access point and can avoid transmitting during that interval.

The process of roaming from one access point to another is not completely defined by the standard. But, the beaconing and probing used to locate access points and a re-association process that allows the station to associate with a different access point, in combination with other vendor specific protocols between access points provides for a smooth transition.

Synchronization between stations on the network is handled by the periodic beacon frames sent by the access point. These frames contain the access point's clock value at the time of transmission so can be used to check for drift at the receiving station. Synchronization is required for various reasons having to do with the wireless protocols and modulation schemes.

Having explained the basic operation for infrastructure mode, ad-hoc mode can be explained by simply saying there is no access point. Only wireless devices are present in this network. Many of the responsibilities previously handled by the access point, such as beaconing and synchronization, are handled by a station. Some enhancements are not available to the ad-hoc network, such as relaying frames between two stations that cannot hear each other.

Besides Windows XP, several computer products have been also developed according to Zero configuration such as the servers, e220ET, e220ST, e220XP and e230SX, having three characteristics, zero install, zero configuration and zero operation. The servers respectively satisfy with the user's demands for small-sized network, middle-sized network, large-sized network and large-sized network with requesting mass storage. For the clients, who need a server to establish their own network but have no ability to maintain, they merely need one CD to easily complete auto installation of operation system (OS), monitor software and network management software by themselves. After inputting Internet Protocol (IP) address through control panel of the server, the clients can begin to use the server. Furthermore, by setting on the control panel, the clients may also easily configure their LAN environment to obtain www service, proxy service, Domain Name System (DNS) service, mail service, File Transfer Protocol (FTP) service, and Network Files System (NFS) service et al.

The present invention referred to the art as disclosed in U.S. Pat. No. 6,327,535 providing a system for locating exterior computer device. The system processes location confirmation and data transmission for certain specific joining portable device by a host and plurality of "Beacon" through wireless LAN.

In accordance with conventional design as mentioned above, the clients must input their own IP address before operating a server and thereby access a LAN. Basically, such design applies to charging mechanism of a wireless network service provider when it provides users wireless network services or security mechanism used in a server for preventing hacker. The users may select one of the sets of available service set identifier (SSID) when entering a wireless network environment. For the encryption of the wireless network, the users should further set Wired Equivalent Privacy (WEP) key. The WEP algorithm is used to protect wireless communication from eavesdropping. The other function of WEP is to prevent unauthorized access to a wireless network.

SUMMARY OF THE INVENTION

Actually, it is unnecessary to emphasize the certification procedure when establishing a home wireless LAN. Repeated certification procedure will obsess home users. Therefore, the object of the present invention is to provide a solution for omitting unnecessary input operation for certification, thereby simplify the home wireless LAN. In ideal condition, user's portable device may be readily detected through access point (AP) by a server in the home wireless LAN when the user actuates it. Then, the server can automatically complete all necessary settings of accessing the wireless LAN for the portable device and provide it with all available services in the wireless LAN.

In the wireless LAN, the server may utilize several wireless transmission channels, such as IEEE 802.11 standards or Infrared Data Association (IrDA), to confirm and update the status of user's portable device as well as provide suitable information services corresponding to the user's demand, when receiving new joining device information from an access point.

DETAILED DESCRIPTION OF THE PREFERRED EMBODIMENT

Figure 1:
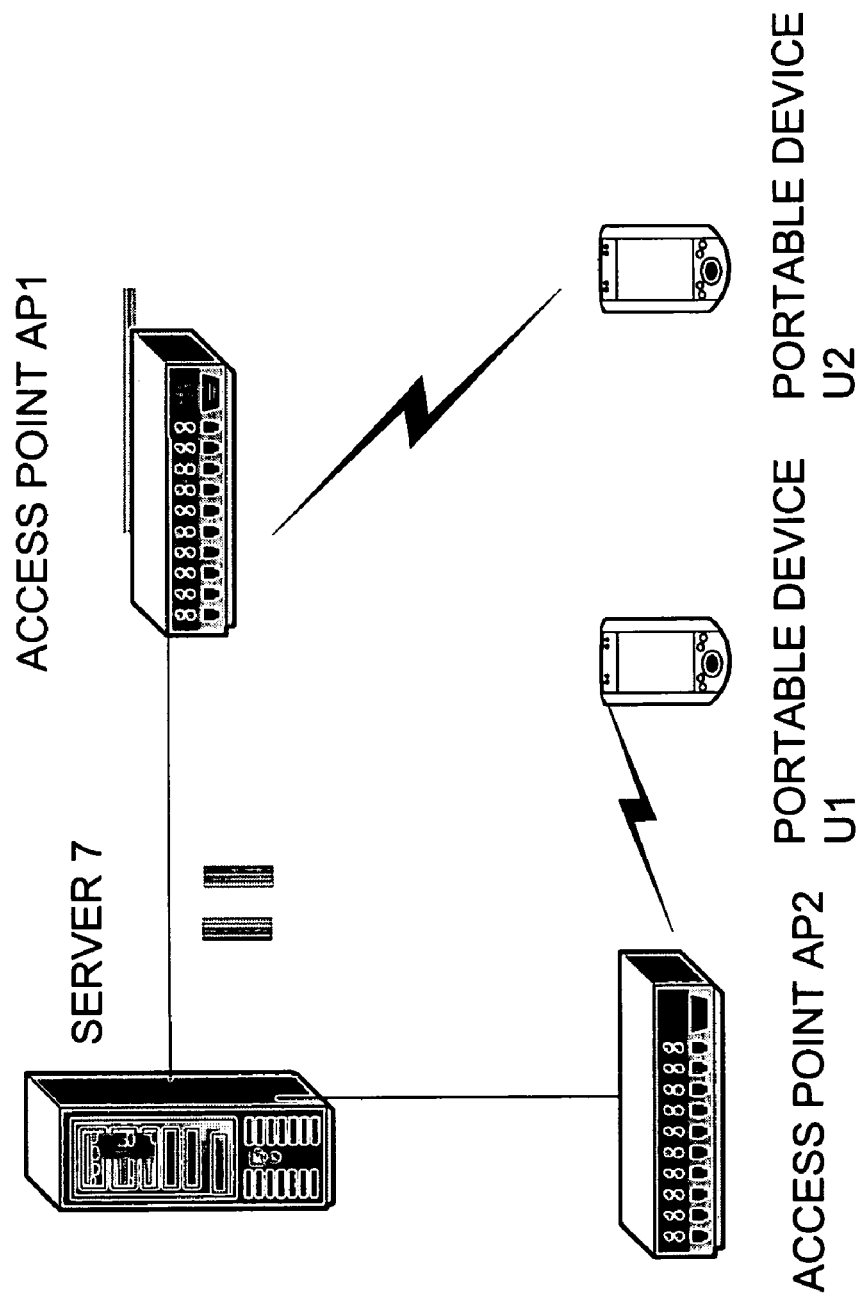
FIG. 1 is a configuration diagram according to the present invention.

Please refer to FIG. 1 that shows a server 7 connecting with an access point (AP) module. The AP module comprises two access points, AP1 and AP2. An existing portable device U1 employs an existing wireless LAN and the server 7 to process data exchange through the access point AP1. In the existing wireless LAN, when a new joining portable device U2 is actuated, a wireless NIC connecting therewith will send a built-in service set identifier (SSID) of the portable device U2 to the access point (AP1 or AP2). Then, the access point sends the built-in SSID to the server 7 for recognition. The server 7 will temporarily cut off a connection between the server and the portable device U1 in the existing wireless LAN and select one set from a plurality of IP address retained in the server 7 for establishing a new connection with the portable device U2 when receiving the built-in SSID. For example, suppose system name of initial SSID used by the server 7 is "MyHome", the server 7 will retain a plurality of SSID whose system name is MyHome for new adding. When the server 7 confirms that system name of the built-in SSID is not MyHome, all connections in the existing wireless LAN will be temporarily cut off by the server for example the server 7 temporarily cut off the connection with the portable device U1; meanwhile selecting one set of IP address retained in the server 7 whose SSID system name is My Home for establishing a new connection with the portable device U2.

After establishing a new connection with the portable device U2, the server 7 use the initial SSID to re-connect with the portable device U1 and transmit all necessary information in the existing wireless LAN to the portable device U2. Once the portable device U2 receive the information, it will temporarily terminate an original setting of IP address therein and use the information from the server 7 whose SSID system name is My Home to substitute the original setting of IP address. The information from the server 7 whose SSID system name is My Home includes a set of IP address, Wired Equivalent Privacy (WEP) key and subsystem identification. Therefore, the portable device U2 can automatically join the existing wireless LAN without inputting authentication.

Figure 2:
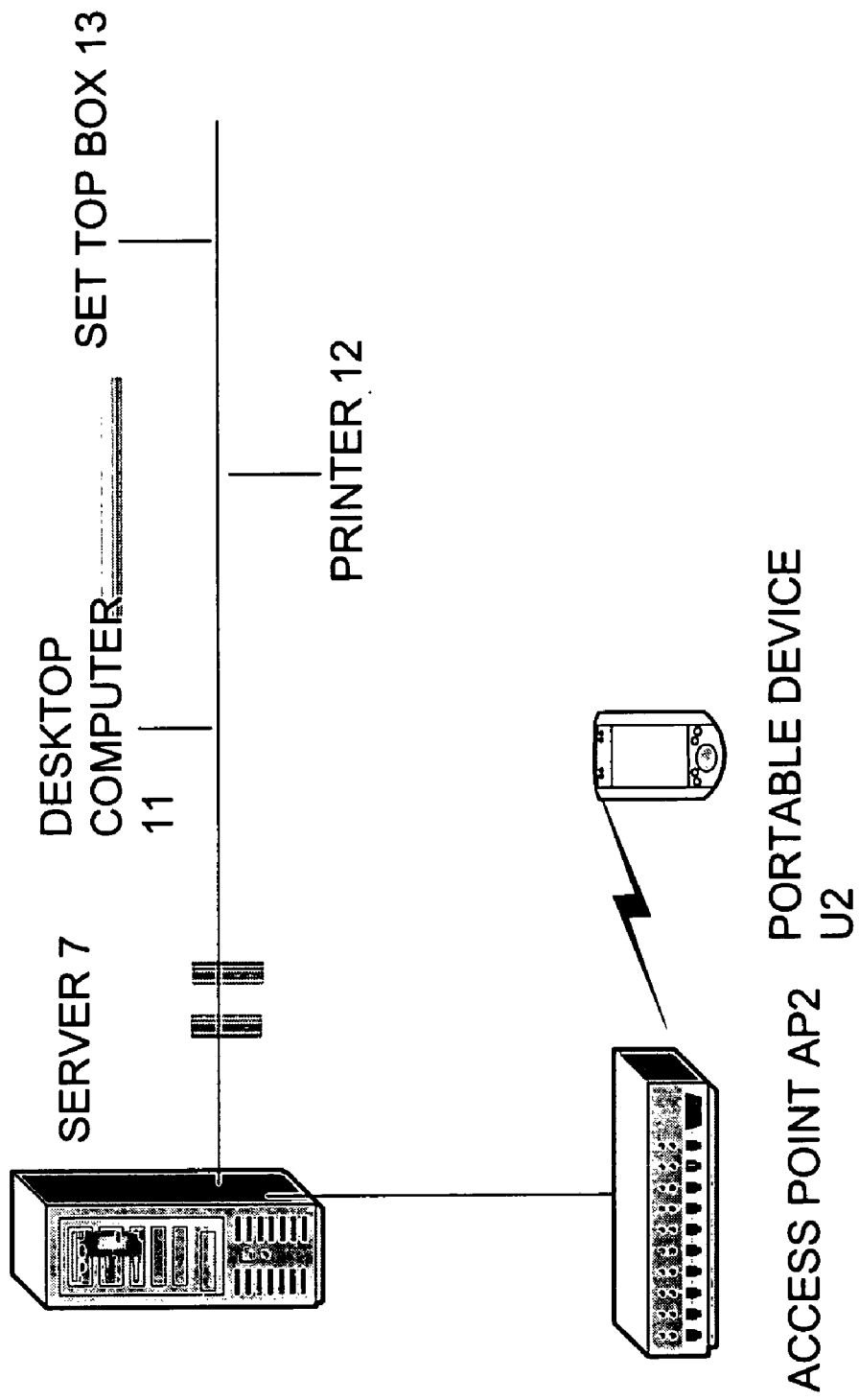
FIG. 2 is a derivational configuration diagram according to the present invention.

FIG. 2 illustrates a derivational configuration diagram in accordance with the present invention. It is able to employ infrastructure topology to extend an existing wired LAN to wireless devices by the server 7 and the access point AP2. The access point AP2 bridges the wireless and wired LAN and acts as a central controller for the wireless LAN. The access point AP2 can coordinate transmission and reception from multiple wireless devices within a specific range. The range and number of devices depend on the wireless standard being used and vendor's product. For example, it is able to connect with a desktop computer 11 or a printer 12 through the server 7, or connect with a TV through a Set top box 13. In infrastructure topology mode there may be multiple access points to cover a large area or only a single access point for a small area such as a single home or small building. Besides, it is also able to use ad-hoc topology. The ad-hoc topology is one in which a LAN is created solely by the wireless devices themselves, with no central controller or access point. Each device communicates directly with other devices in the network rather than through a central controller. This is useful in places where small groups of computers might congregate and not need access to another network.

Figure 3:
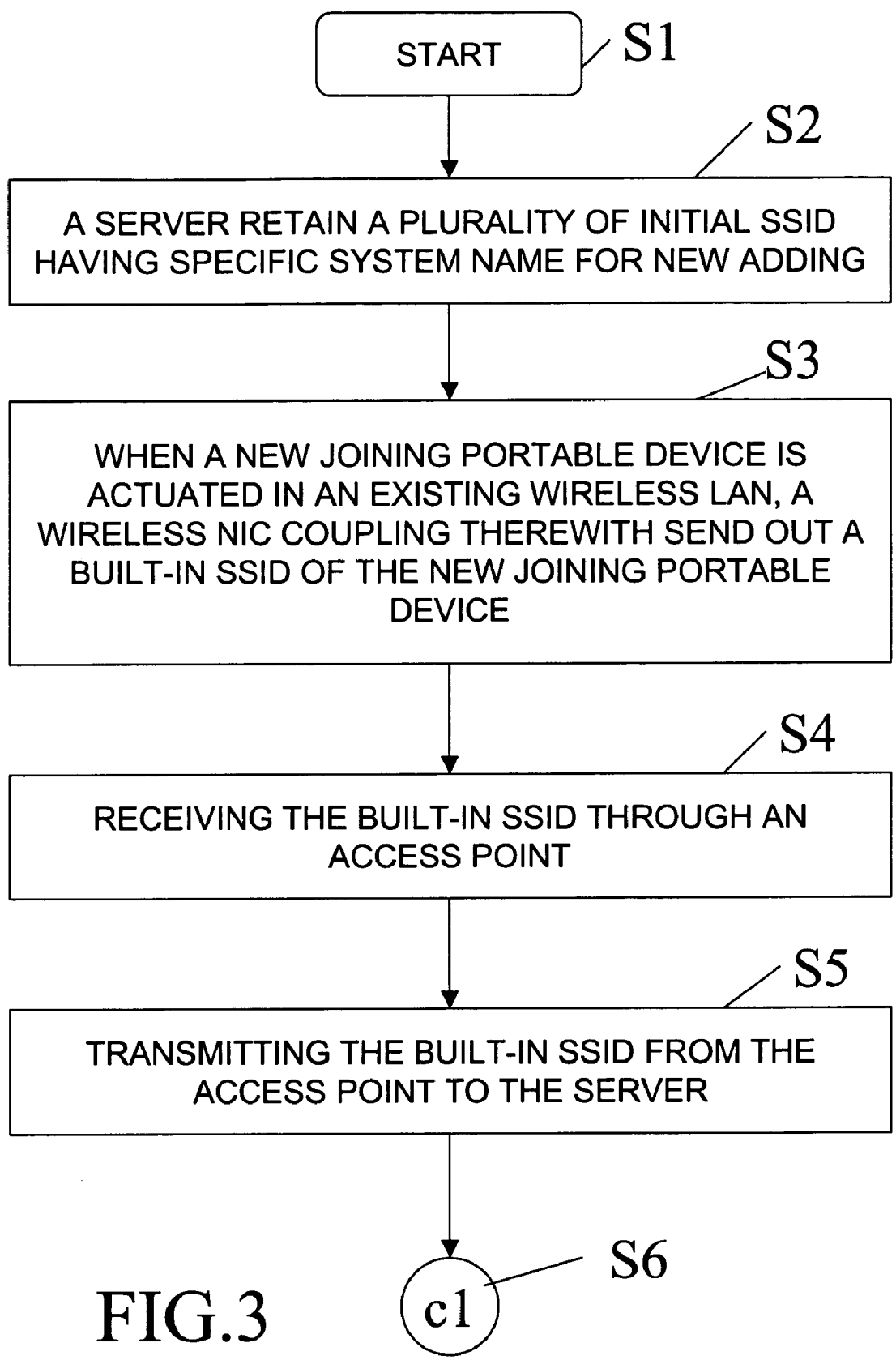
FIG. 3–FIG. 5 are flow chart diagrams according to the present invention.
Figure 4:
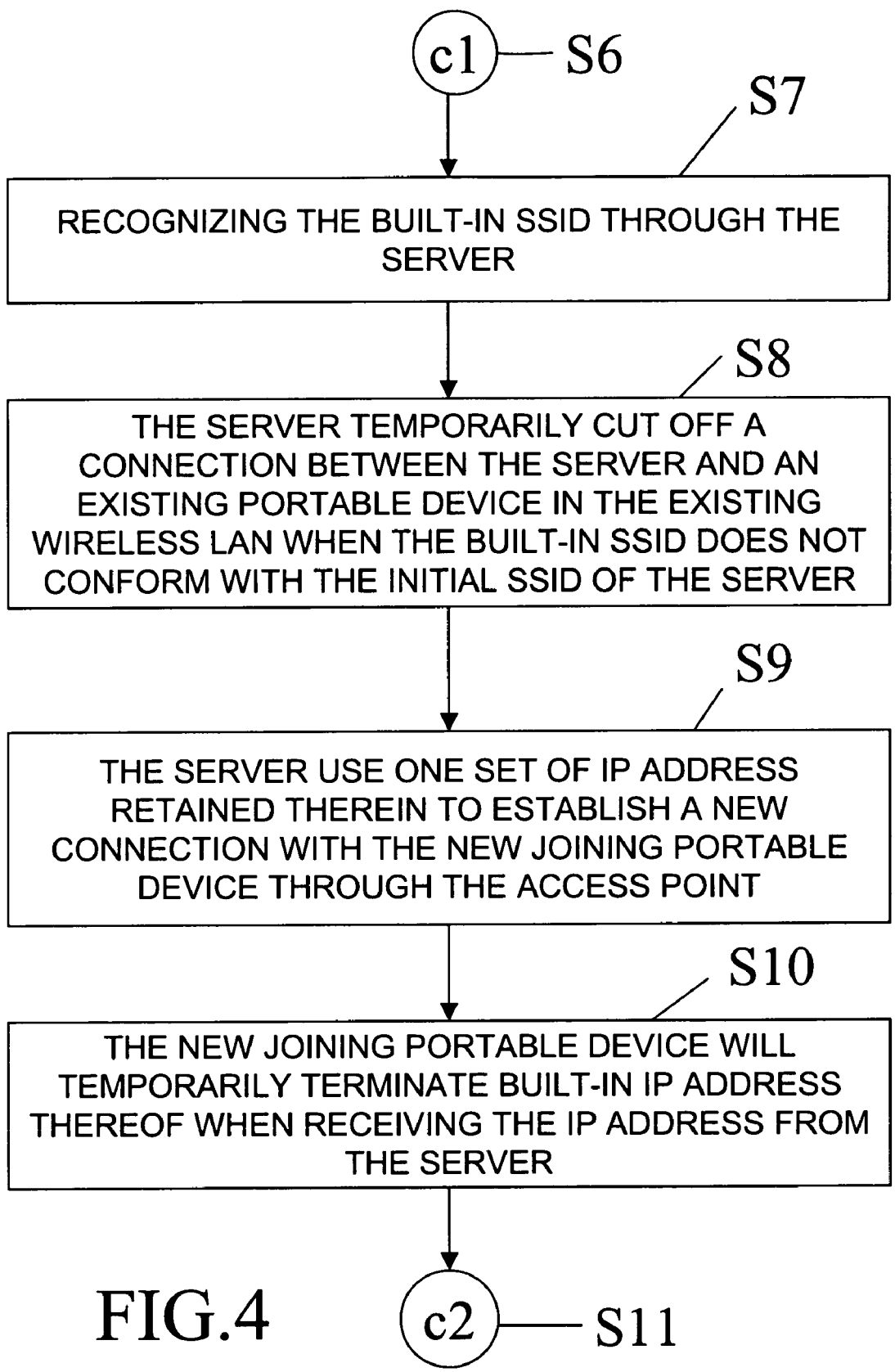
Figure 5:
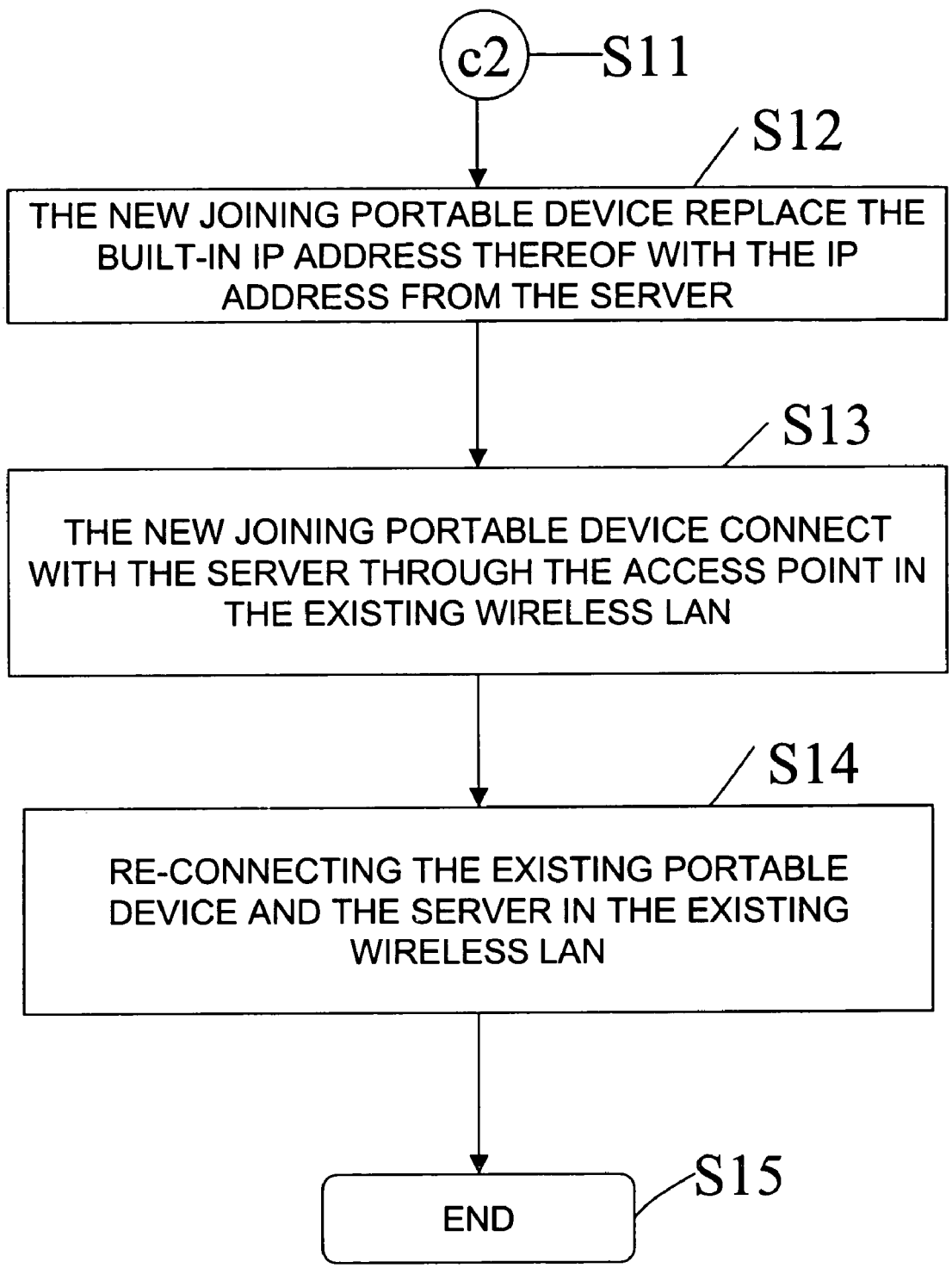

FIG. 3–FIG. 5 are flow chart diagrams in accordance with the present invention. The flow path includes the following steps:

Firstly, please refer to FIG. 3.

(1) a server retain a plurality of initial SSID having specific system name for new adding (step S2);

(2) when a new joining portable device is actuated in an existing wireless LAN, a wireless NIC coupling therewith send out a built-in SSID of the new joining portable device (step S3);

(3) receiving the built-in SSID by an access point (step S4);

(4) transmitting the built-in SSID from the access point to the server (step S5);

Next as shown in FIG. 4:

(5) recognizing the built-in SSID by the server (step S7);

(6) the server temporarily cut off a connection between the server and an existing portable device in the existing wireless LAN when the built-in SSID does not conform with initial SSID of the server (step S8)

(7) the server use an IP address retained therein to establish a new connection with the new joining portable device through the access point (step S9);

(8) the new joining portable device temporarily terminate built-in IP address thereof when receiving the IP address from the server (step S10);

Next as shown in FIG. 5:

(9) the new joining portable device replace the built-in IP address thereof with the IP address from the server (step S12);

(10) the new joining portable device connect with the server through the access point in the existing wireless LAN (step S13);

(11) re-connecting the existing portable device and the server in the existing wireless LAN (step S14).

What is claimed is:

1. An automatic recognition system for use in a wireless local area network (LAN), which can automatically detect a new joining portable device and provide the same with a new recognition number in an existing wireless LAN, the system comprises:

an access point (AP) module having at least one access point, the access point can bridge the wireless and a wired LAN and act as a central controller for the wireless LAN, meanwhile the access point can coordinate transmission and reception from multiple wireless devices within a specific range;

a server having a plurality of initial service set identifier (SSID) connect with an existing portable device through the AP module, automatically complete all necessary setting of accessing the existing wireless LAN for a user and provide the user with all available services in the existing wireless LAN;

when the new joining portable device is actuated in the existing wireless LAN, a wireless Network Interface Card (NIC) coupling therewith send a built-in SSID of new joining portable device to the server for recognition;

when receiving the built-in SSID from the new joining portable device, the server will temporarily cut off a connection between the server and an existing portable device in the existing wireless LAN and select a IP address retained in the server to establish a new connection with the new joining portable device;

after establishing the new connection with the new joining portable device, the server use the initial SSID to re-connect with the existing portable device and send the same to the new joining portable device;

after receiving the initial SSID, the new joining portable device temporarily terminate a built-in IP address thereof and replace the built-in IP address with an initial IP address from the server.

2. The system of claim 1 wherein the initial SSID from server includes a set of IP address, Wired Equivalent Privacy (WEP) key and subsystem identification.

3. An automatic recognition method for use in a wireless local area network (LAN), which can automatically detect a new joining portable device by a server connecting with an existing wireless LAN or wired LAN and provide the new joining portable device with a new identification number in the existing wireless LAN, the method comprises the steps of:

retaining a plurality of initial service set identifier (SSID) having specific system name for new adding by the server;

when the new joining portable device is actuated in the existing wireless LAN, sending out a built-in service set identifier (SSID) of the new joining portable device by a wireless Network Interface Card (NIC) coupling with the new joining portable device;

receiving the built-in SSID by an access point;

transmitting the built-in SSID from the access point to the server;

recognizing the built-in SSID by the server;

when the built-in SSID does not conform with the initial SSID of server, temporarily cutting off a connection between the server and an existing portable device in the existing wireless LAN;

using an IP address retained in the server to establish a new connection with the new joining portable device through the access point;

temporarily terminating built-in IP address of the new joining portable device after receiving the IP address from the server;

replacing the built-in IP address the new joining portable device with the IP address from the server;

connecting the new joining portable device and the server by the access point in the existing wireless LAN;

re-connecting the existing portable device and the server in the existing wireless LAN.

4. The method of claim 3 wherein the new joining portable device can extend the wired LAN to wireless devices by utilizing the server and the access point after joining in the existing wireless LAN.

5. The method of claim 3 wherein the access point can bridge the wireless LAN and wired LAN and act as a central controller for the wireless LAN.

6. The method of claim 3 wherein the access point can coordinate transmission and reception from multiple wireless devices within a specific range.

7. The method of claim 3 wherein the access point can connect with a plurality of peripherals through the wireless LAN by the server.

8. The method of claim 7 wherein the peripherals comprise a desktop computer, a printer and a Set top box.

9. The method of claim 3 wherein the initial service set identifier (SSID) of the server includes a set of IP address, Wired Equivalent Privacy (WEP) key and subsystem identification.

10. An automatic recognition method in accordance with Zero Configuration for use in a wireless local area network (LAN), which can automatically detect a new joining portable device by a server and provide the new joining portable device with a new identification number, the server connect with an access point module having at least one access point through an existing wireless LAN or wired LAN, the method comprises the steps of:

retaining a plurality of SSID which have specific system name by the server;

when a new joining portable device is actuated in the existing wireless LAN in accordance with the Zero configuration, sending out a built-in SSID of the new joining portable device to the access point by a wireless Network Interface Card (NIC) coupling with the new joining portable device, then sending the built-in SSID from the access point to the server for recognition;

when the built-in SSID does not conform with initial SSID of the server, temporarily cutting off a connection between the server and an existing portable device in the existing wireless LAN, and using an IP address retained in the server to establish a new connection with the new joining portable device;

temporarily terminating built-in IP address of the new joining portable device after receiving the IP address from the server, replacing the built-in IP address with the IP address from the server and thereby connecting with the server through the access point, then re-connecting the existing portable device with the server.

11. The method of claim 10 wherein the server and the access point can extend the existing wired LAN to wireless devices after the new joining portable device connect with existing wireless LAN.

12. The method of claim 10 wherein the access point can bridge the wireless LAN and the wired LAN and act as a central controller for the wireless LAN.

13. The method of claim 10 wherein the access point can coordinate transmission and reception from multiple wireless devices within a specific range.

14. The method of claim 10 wherein the access point can connect with a plurality of peripherals through the wireless LAN by the server.

15. The method of claim 14 wherein the peripherals comprise a desktop computer, a printer and a Set top box.

16. The method of claim 10 wherein the initial service set identifier (SSID) of the server includes a set of IP address, Wired Equivalent Privacy (WEP) key and subsystem identification.

* * * * *